(12) United States Patent
Potter et al.

(10) Patent No.: US 8,036,857 B2
(45) Date of Patent: Oct. 11, 2011

(54) DESIGN MODELLING

(75) Inventors: Charles Mike Potter, Nepean (CA);
Alexei Pogrebtsov, Nepean (CA)

(73) Assignee: International Business Machines Corporation, Armonk, NY (US)

(*) Notice: Subject to any disclaimer, the term of this patent is extended or adjusted under 35 U.S.C. 154(b) by 883 days.

(21) Appl. No.: 10/851,942

(22) Filed: May 21, 2004

(65) Prior Publication Data
US 2005/0010894 A1      Jan. 13, 2005

(30) Foreign Application Priority Data
May 22, 2003 (CA) .................................. 2429336

(51) Int. Cl.
*G06F 17/50* (2006.01)
(52) U.S. Cl. ........................................ 703/1; 707/809
(58) Field of Classification Search .................. 703/1, 2; 707/104.1, 809; 715/741
See application file for complete search history.

(56) References Cited

U.S. PATENT DOCUMENTS

| 5,550,968 A | * | 8/1996 | Miller et al. | 715/741 |
| 2002/0169788 A1 | * | 11/2002 | Lee et al. | 707/104.1 |

OTHER PUBLICATIONS

European Search Report (under Rule 45 of European Patent Convention) for Application No. EP 04012196.4-2201 Dated Mar. 3, 2006, 3 pages.
European Examination Report for Application No. EP 04012196.4-2201 Dated Jun. 20, 2007, 2 pages.
European Examination Report for Application No. EP 04012196.4-2201 Dated Jul. 30, 2008, 3 pages.

* cited by examiner

*Primary Examiner* — Paul Rodriguez
*Assistant Examiner* — Luke Osborne
(74) *Attorney, Agent, or Firm* — Patterson & Sheridan, LLP

(57) ABSTRACT

A design modelling system for operating on disparate data models in a single application is provided. The design modelling system comprises at least one source file defining a source data model, a modelling development environment module for consuming source files, and an internal generic data model transformed from the source data model in accordance with direction provided by elements of consumed source files.

18 Claims, 3 Drawing Sheets

DESIGN MODELLING

FIELD OF THE INVENTION

The invention relates to a system and method of design modelling.

BACKGROUND OF THE INVENTION

There are standard approaches for implementing model development tools. One approach is to have a specialized application, i.e., one application for one class of models. For example, a text editor can edit text. However, the text editor is limited to only editing text. Another approach is to have unified modelling frameworks, i.e., different classes of models are developed in the same environment with a limited set of specialized features. Both approaches are widely used by software providers. For example, there are many applications that allow a user to edit extensible markup language (XML) documents. Such applications do not have complete understanding of a nature and semantics of XML elements and their attributes inside the XML document. This requires from the user a complete low-level understanding of how a model is encoded into the XML format. Some other applications provide specialized plug-ins for editing a limited set of XML documents such as XML schemas, or extensible hypertext markup language (XHTML). The disadvantage of the existing frameworks is that they either do not provide enough specialized modelling features, or implementing specialization is similar to implementing a stand-alone application for a particular class of model, which is an expensive and time consuming process.

SUMMARY OF THE INVENTION

It is an object of the present invention to solve one or more of the problems described above.

In accordance with an embodiment of the present invention, there is provided a design modelling system for operating on disparate data models in a single application. The design modelling system comprises at least one source file defining a source data model, a modelling development environment module for consuming source files, and an internal generic data model transformed from the source data model in accordance with direction provided by elements of consumed source files.

In accordance with another embodiment of the present invention, there is provided a method of operating on disparate data models in a single application. The method comprises the steps of receiving at least one source file defining a source data model, consuming source files within a modelling development environment module, transforming the source data model into an internal generic data model in accordance with direction provided by elements of consumed source files, and applying the internal generic data model.

In accordance with another embodiment of the present invention, there is provided a computer data signal embodied in a carrier wave and representing sequences of instructions which, when executed by a processor, cause the processor to perform a method of operating on disparate data models in a single application. The method comprises the steps of receiving at least one source file defining a source data model, consuming source files within a modelling development environment module, transforming the source data model into an internal generic data model in accordance with direction provided by elements of consumed source files, and applying the internal generic data model.

In accordance with another embodiment of the present invention, there is provided a computer-readable medium having computer readable code embodied therein for use in the execution in a computer of a method of operating on disparate data models in a single application. The method comprising the steps of receiving at least one source file defining a source data model, consuming source files within a modelling development environment module, transforming the source data model into an internal generic data model in accordance with direction provided by elements of consumed source files, and applying the internal generic data model.

In accordance with another embodiment of the present invention, there is provided a computer program product for use in the execution in a computer of a design modelling system for operating on disparate data models in a single application. The computer program product comprises at least one source file defining a source data model, a modelling development environment module for consuming source files, and an internal generic data model transformed from the source data model in accordance with direction provided by elements of consumed source files.

DETAILED DESCRIPTION OF THE PREFERRED EMBODIMENTS

There is a need in the art to provide an extendable development environment for different classes of models. An embodiment of the present invention uses a model behaviour specification to provide a customizable, feature-rich modelling environment for virtually any class of models, and data documents. With this model behaviour specification, a model designer may specify aspects of the modelling environment for a particular class of models.

The proposed approach is based on the framework paradigm but also provides a way to describe the nature and semantics of the models as well as the ability to extend the environment with specialized features that are not presented in the framework's library by default.

Figure 1:
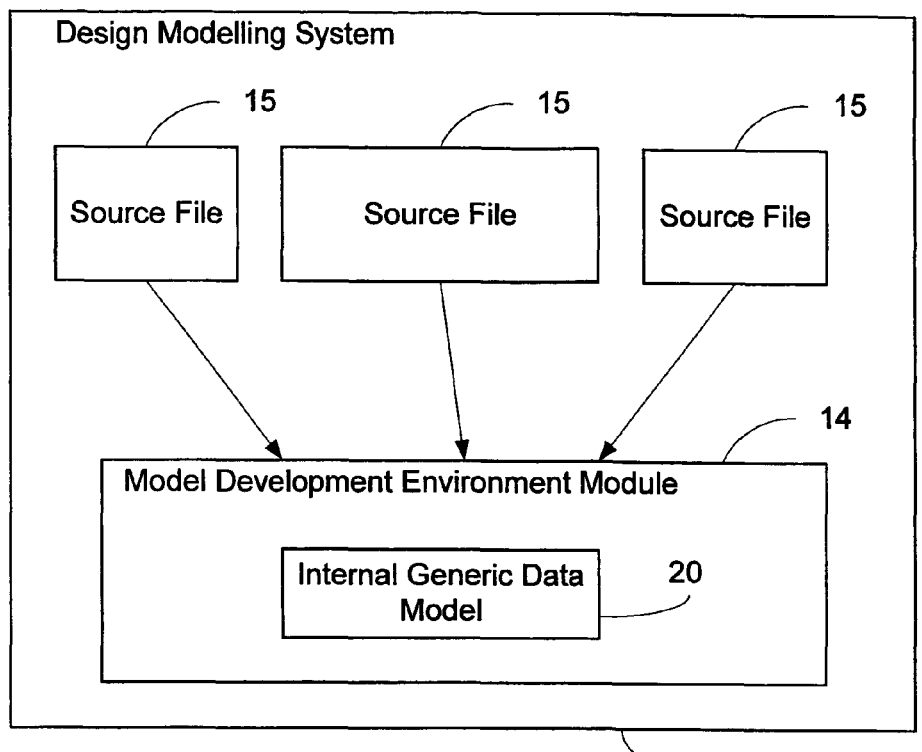
FIG. 1 shows an example of a design modelling system, in accordance with an embodiment of the present invention.

FIG. 1 shows an example of a design modelling system 10, in accordance with an embodiment of the present invention. The design modelling system 10 comprises one or more source files 15 that define a source data model, a modelling development environment (MDE) module 14 for consuming the source files 15, and an internal generic data model 20 transformed from the source data model in accordance with direction provided by elements of the consumed source files. The internal generic data model 20 may be implemented within the MDE module 14, or alternatively, as a separate component within the design modelling system 10. The design modelling system 10 may comprise other components such as a data model receiving module for receiving a data model, a syntax and integrity component for defining one or more classes of the data model, and a semantics unit for defining the data model in terms of the MDE.

Figure 2:
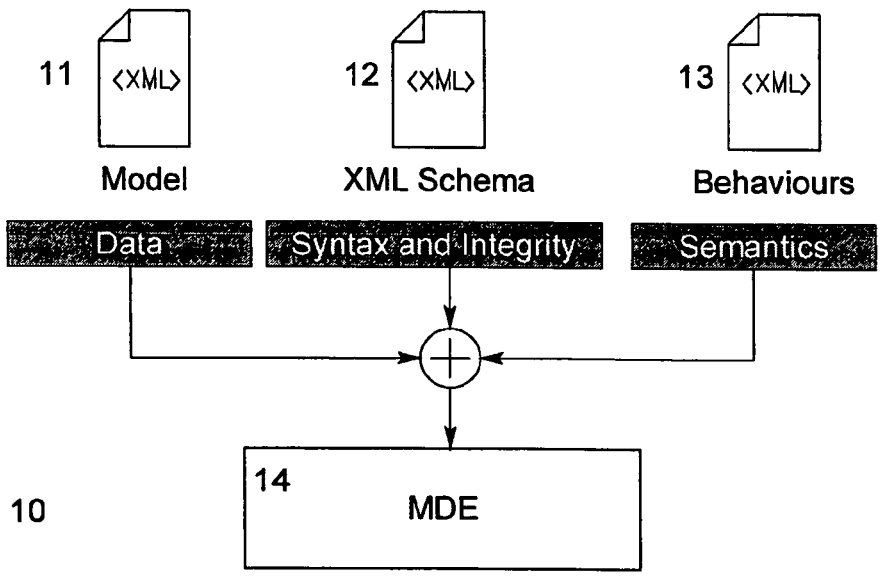
FIG. 2 shows an example of a high-level overview of a design modelling system.

FIG. 2 shows an example of an architecture of a high-level overview of an embodiment of the design modelling system 10. The MDE 14 consumes the following XML documents:

Model 11, XML encoded data;

XML Schema 12, this document defines the XML elements and their possible attributes in terms of the XML format;

Behaviours 13, this document describes the semantics of the XML elements, the rules for creating, modifying the objects—information that the system 10 uses for editing the data document 11.

Preferably, the data model 11 comprises an extensible markup language (XML) document providing data to the design modelling system 10. The XML document (or data model 11) and the XML schema 12 are describing the class of XML documents and represent a physical layer of the model 11. The XML schema 12 provides the syntax and integrity to the design modelling system 10. Preferably, the behaviour specification 13 comprises an XML document, and defines a semantical layer, i.e., the model structure in terms of the modelling environment and also a meaning and behaviour of every model element. The MDE 14 includes a set of features and use-patterns that allow a user to create and modify data model. The combination of the data model 11, integrity rules 12 and semantical behaviour specification 13 makes it possible for the MDE to provide a user with a specialized and customized modelling environment.

Preferably, the design modelling system 10 comprises an internal generic data model, which comprises i) one or more objects, and ii) corresponding object properties. The generic MDE data model comprises an MDE element having one or more attributes, one or more child objects and corresponding child object properties. Child objects may also have one or more attributes and other child objects with corresponding child object properties.

Figure 3:
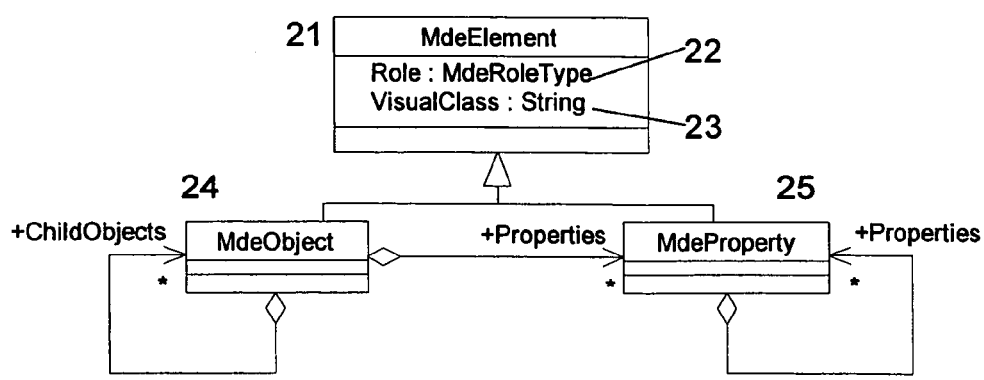
FIG. 3 shows an example of an internal generic modelling design environment data model of a design modelling system.

FIG. 3 diagrams an exemplary example of an internal generic MDE data model 20 in accordance with an embodiment of the modelling system 10. The generic MDE data model 20 comprises an MDE element 21 having a role attribute 22 for specifying the semantical meaning of the modelling development environment element 21, and a visual class attribute 23 for specifying a class of the modelling development environment element 21. The role attribute 22 is of an MdeRoleType. Examples of the MdeRoleType include Association, and NameProperty. The visual class attribute 23 (VisualClass) is of type String and references the name of the visual class of the MDE element 21. The MDE element 21 is a base class for the MDE object 24 and MDE property 25.

The behaviour specification 13 declares the rules by which the model XML document 11 can be transformed into the MDE internal data model 20. The transformation is based on the mapping rules that specify additional MDE attributes for the XML elements that match the specified criteria (XML path language (Xpath) expression). For example:

<map match="folder/myElement"
        role="object.compound"
        class="MyElementClass"/>

This rule says that every XML element 21 in the source document 11 that matches the expression "folder/myElement" will represent an object 24 in the MDE internal data structure 20, and that object 24 will have role 22 "compound" and visual class 23 "MyElementClass".

Having the source data model transformed into the internal representation the MDE system 10 can visually present the data model to the user.

Figure 4:
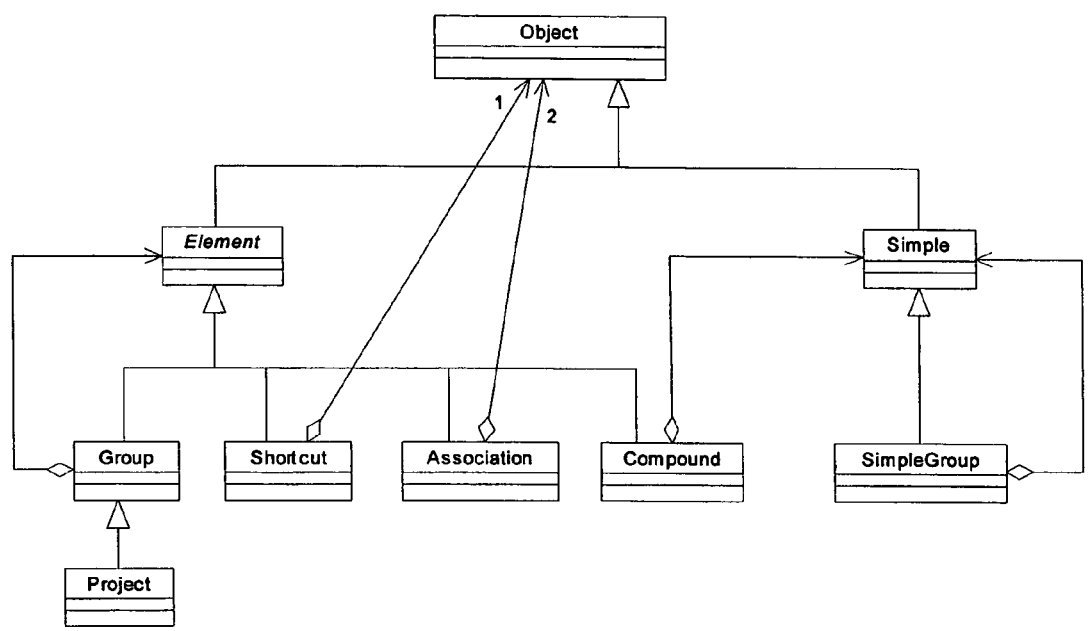
FIG. 4 shows an example of a logical hierarchy of the object roles in a design modelling system.

The role attribute 22 specifies the MDE semantical meaning (or behaviour) of the model element 21. FIG. 4 depicts an example of a logical hierarchical structure of the object roles in the design modelling system 10. Applying the role 22 attaches the predefined set of features and constraints for the objects 24. For example, specifying that the element 21 has role 22 "Group" means that that element 21 may contain other model elements 21 and should be by default displayed using group folder in the MDE views. The object roles are divided on two major classes: "Element" and "Simple". The objects of class "Element" may exist in the model independently, when objects that belong to the class "Simple" can exist in the content of any other object with a role "Compound". The elements having role "Group" or "Project" may contain other elements. The elements with the role "Shortcut" are representing links to other elements in the model. The elements with the role "Association" define relationship between two objects in the model. The elements with a role "Compound" are the regular objects.

Figure 5:
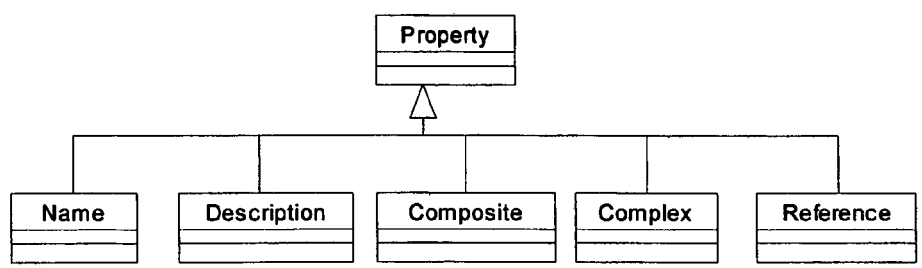
FIG. 5 shows an example of a logical hierarchy of the property roles in a design modelling system.

The visual class attribute 23 is specifying a class declared in the behaviour specification document 13. FIG. 5 depicts an example of a logical hierarchical structure of the property roles in the design modelling system 10. A visual class in the design modelling system 10 is a way to customize default behaviour specified by the role attribute 22. The definition of the visual class 23 contains the information to customize the visual representation of the model element (e.g., display name, state icons, visibility, etc.), as well as its behaviour in the MDE 14 (i.e., is it modifiable, movable, what are the handlers for the default and custom actions attached to the element, etc). Example property roles are illustrated in Table 1 as follows:

TABLE 1

Property Roles

"Name" - value of this property contains a name of the object;
"Description" - value of the property contains a description of the object;
"Composite" - the value of the property is a composition of other properties (the properties with this role can specially displayed in a properties view of a modelling environment);
"Complex" - properties with this role require special custom component for displaying and editing their values;
"Reference" - this role specifies that the property value contains an identifier of an object in the model (for example shortcuts keep the reference to the source objects in a property with a role "Reference").

Figure 6:
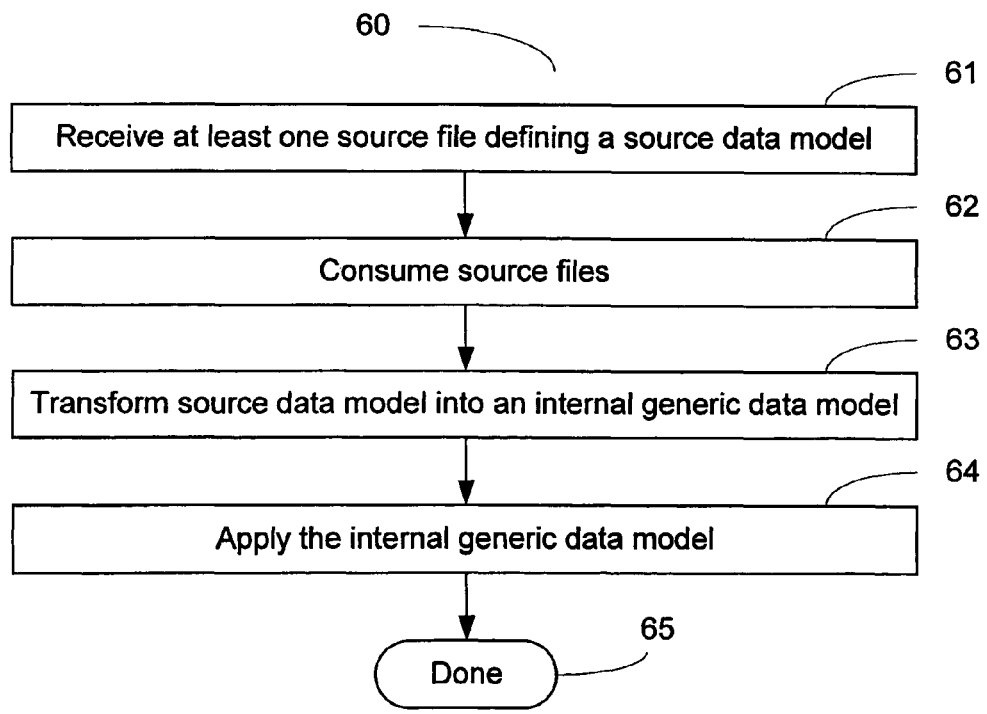
FIG. 6 shows a flowchart of a method of operating on disparate data models in a single application, in accordance with an embodiment of the design modelling system.

FIG. 6 shows a flowchart of a method of operating on disparate data models in a single application (60); in accordance with an embodiment of the design modelling 25 system 10. The method (60) begins with receiving one or more than one source file defining a source data model (61). Next, the source files are consumed within an MDE module 14 (62). Next, the source data model is transformed into an internal generic data model 20 in accordance with direction provided by elements of the consumed source files (63). Finally, the internal generic data model is ready to be applied (64). The method 30 (60) is done (63). Other steps may be added to the method (60) such as creating the source data model, and transforming the operated generic data model into an external data model. Advantageously, XML documents may be mapped to the generic data model by specifying additional attributes that can be understood by the modelling environment.

Another feature of the design modelling system 10 is a plug-in based modelling environment. The model behaviour specification 13 document defines a set of binary plug-ins that may be loaded into the design modelling system 10 and initialized when a model is being loaded. Preferably, these plug-ins contain implementations of the components that will be integrated into the user interface (UI) architecture in order to customize the modelling UI environment. The plug-ins are binary modules that are compiled and recompiled. In order to extend the modelling environment of any class of documents, capability is provided to create a new small plug-in without recompiling existing plug-ins. In addition to this, a user can reuse any standard component provided in the standard MDE library.

The MDE application also provides a wide range of generic components that can be used "out of the box" to implement modelling environments. For example, generic components include a project tree view, a diagram view, an object explorer, a properties view, a base model designer, and different types of editors. These generic components include predefined plug-ins that can be used for displaying and editing different elements or properties of a model.

Advantageously, the design modelling system 10 provides a general UI framework, i.e., multiple classes of models for one application. Thus, a user may open different types of documents having different UI's within a single application, without having to recompile that application.

The design modelling system 10 according to the present invention, as well as the methods described above, may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A design modelling system for operating on a plurality of disparate data models in a model editing application, the design modelling system comprising:
   one or more computer processors;
   the model editing application, wherein the model editing application includes a modelling development environment module that includes: (i) a syntax and integrity component and (ii) a semantics unit;
   a plurality of schemas, each schema defining a structure for a respective one of the plurality of disparate data models, the structure including a plurality of different document elements;
   the plurality of disparate data models, each disparate data model comprising a structured document conforming to a different one of the plurality of schemas; and
   a plurality of behaviour specifications, each behaviour specification being associated with a different one of the plurality of disparate data models, each behaviour specification for configuring behaviour of the model editing application in regards to the plurality of different document elements of the respective data model, wherein each behaviour specification defines: (i) an name for a first document element of the respective data model, the name to be output for display in the model editing application, (ii) whether the first document element is visible in the model editing application, and (iii) whether the first document element is modifiable by a user of the model editing application;
   wherein the modelling development environment module configures behaviour of the model editing application based on: (i) a first data model of the plurality of disparate data models, (ii) a schema associated with the first data model, the schema being selected from the plurality of schemas, and (iii) a behaviour specification associated with the first data model, the behaviour specification being selected from the plurality of behaviour specifications, whereby the model editing application is configured such as to provide a user environment for editing the first data model in accordance with the behaviour specification and by operation of the one or more computer processors, wherein configuring behaviour of the model editing application comprises constructing an internal generic data model based on the first data model, the schema, and the behaviour specification;
   wherein the behaviour specification further defines: (i) a model structure in terms of the user environment and (ii) meaning of document elements; wherein the syntax and integrity component defines at least one class of the first data model, wherein the semantics unit includes behaviour specification rules for transforming the source data model into an internal generic data model and is configured to consume the behaviour specification and further define the first data model in terms of the user environment;
   wherein the design modelling system further comprises at least one of: (i) a project tree viewer for outputting the internal generic data model in a project tree; (ii) a diagram tree viewer for outputting the internal generic data model in a diagram tree; (iii) an object explorer for outputting an object in the user environment, the object corresponding to a document element; (iv) a properties viewer for outputting one or more object properties; (v) a base model designer for developing the first data model; and (vi) an editor for modifying one or more files in the design modelling system.

2. The system as claimed in claim 1, wherein the internal generic data model includes one or more object properties.

3. The system as claimed in claim 2, wherein an object of the internal generic data model comprises an object having:
   one or more attributes;
   one or more child objects; and
   one or more child object properties.

4. The system as claimed in claim 3, wherein the object further comprises a role attribute for specifying a semantical meaning of the object.

5. The system as claimed in claim 4, wherein the internal generic data model includes one or more objects, and wherein the role attribute is an object role for providing a predefined set of features and constraints on an object of the one or more objects.

6. The system as claimed in claim 5, wherein the object role is one of:
   an element for existing in the model independently from other objects;
   a simple for representing an object;
   a simple group for containing one or more simples;
   a compound for representing an object, the compound comprising at least one of:
   one or more elements; and one or more simples;
a group for containing one or more model elements;
a project for containing one or more groups;
an association for defining a relationship between two model objects; and
a shortcut for representing links to other model objects.

7. The system as claimed in claim 4, wherein the role attribute is a property role for configuring behaviour of an object of the one or more objects.

8. The system as claimed in claim 7, wherein the role attribute is one of:
a name for representing a name of the object;
a description for representing a description of the object;
a composite for representing a composition of other properties of the object;
a complex for representing custom behaviour properties of the object; and
a reference for containing an identifier of a model object.

9. The system as claimed in claim 3, wherein the object further comprises a visual class attribute for specifying a class of the object.

10. The system as claimed in claim 1, wherein the behaviour specification further defines a set of binary plug-ins.

11. The system as claimed in claim 10, wherein the plug-ins comprise implementations of components to be integrated into a user interface architecture for configuring the user environment.

12. The system as claimed in claim 1, wherein the user environment comprises a library of reusable data model components, wherein the internal generic data model includes one or more objects, each object corresponding to a document element of the first data model, wherein the internal generic data model applies the behaviour specification such as to prevent the user from modifying at least one object, in accordance with the behaviour specification, and wherein the model editing application is configured to edit the first data model in accordance with the internal generic data model, based on user input received by the model editing application.

13. A method of operating on a plurality of disparate data models in a model editing application, the method comprising configuring one or more computer processors to perform an operation comprising:
receiving a plurality of schemas, each schema defining a structure for a respective one of the plurality of disparate data models, the structure including a plurality of different document elements;
receiving the plurality of disparate data models, each disparate data model comprising a structured document conforming to a different one of the plurality of schemas;
receiving a plurality of behaviour specifications, each behaviour specification being associated with a different one of the plurality of disparate data models, each behaviour specification for configuring behaviour of the model editing application in regards to the plurality of different document elements of the respective data model, wherein each behaviour specification defines: (i) an name for a first document element of the respective data model, the name to be output for display in the model editing application, (ii) whether the first document element is visible in the model editing application, and (iii) whether the first document element is modifiable by a user of the model editing application; and
configuring behaviour of the model editing application based on: (i) a first data model of the plurality of disparate data models, (ii) a schema associated with the first data model, the schema being selected from the plurality of schemas, and (iii) a behaviour specification associated with the first data model, the behaviour specification being selected from the plurality of behaviour specifications, whereby the model editing application is configured such as to provide a user environment for editing the first data model in accordance with the behaviour specification and by operation of the one or more computer processors, wherein configuring behaviour of the model editing application comprises constructing an internal generic data model based on the first data model, the schema, and the behaviour specification;
wherein the behaviour specification further defines: (i) a model structure in terms of the user environment and (ii) meaning of document elements; wherein the model editing application includes a modelling development environment module that includes: (i) a syntax and integrity component and (ii) a semantics unit, wherein the syntax and integrity component defines at least one class of the first data model, wherein the semantics unit includes behaviour specification rules for transforming the source data model into an internal generic data model and is configured to consume the behaviour specification and further define the first data model in terms of the user environment;
wherein the design modelling application is associated with at least one of: (i) a project tree viewer for outputting the internal generic data model in a project tree; (ii) a diagram tree viewer for outputting the internal generic data model in a diagram tree; (iii) an object explorer for outputting an object in the user environment, the object corresponding to a document element; (iv) a properties viewer for outputting one or more object properties; (v) a base model designer for developing the first data model; and (vi) an editor for modifying one or more files associated with the design modelling application.

14. The method of claim 13, wherein the operation further comprises loading a plug-in to provide at least one additional feature relevant to the internal generic data model.

15. The method of claim 13, wherein the operation further comprises creating the first data model, wherein the internal generic data model is constructed by the modelling development environment module; wherein the internal generic data model includes one or more objects, each object corresponding to a document element of the first data model, wherein the internal generic data model applies the behaviour specification such as to prevent the user from modifying at least one object, in accordance with the behaviour specification, and wherein the model editing application is configured to edit the first data model in accordance with the internal generic data model, based on user input received by the model editing application.

16. The method of claim 13, wherein the operation further comprises transforming the internal generic data model into an external data model.

17. A non-transitory computer-readable medium having computer readable code embodied therein for use in the execution in a computer of a method of operating on a plurality of disparate data models in a model editing application, the method comprising steps of:
receiving a plurality of schemas, each schema defining a structure for a respective one of the plurality of disparate data models, the structure including a plurality of different document elements;

receiving the plurality of disparate data models, each disparate data model comprising a structured document conforming to a different one of the plurality of schemas;

receiving a plurality of behaviour specifications, each behaviour specification being associated with a different one of the plurality of disparate data models, each behaviour specification for configuring behaviour of the model editing application in regards to the plurality of different document elements of the respective data model, wherein each behaviour specification defines: (i) an name for a first document element of the respective data model, the name to be output for display in the model editing application, (ii) whether the first document element is visible in the model editing application, and (iii) whether the first document element is modifiable by a user of the model editing application; and configuring behaviour of the model editing application based on: (i) a first data model of the plurality of disparate data models, (ii) a schema associated with the first data model, the schema being selected from the plurality of schemas, and (iii) a behaviour specification associated with the first data model, the behaviour specification being selected from the plurality of behaviour specifications, whereby the model editing application is configured such as to provide a user environment for editing the first data model in accordance with the behaviour specification, wherein configuring behaviour of the model editing application comprises constructing an internal generic data model based on the first data model, the schema, and the behaviour specification;

wherein the behaviour specification further defines: (i) a model structure in terms of the user environment and (ii) meaning of document elements; wherein the model editing application includes a modelling development environment module that includes: (i) a syntax and integrity component and (ii) a semantics unit, wherein the syntax and integrity component defines at least one class of the first data model, wherein the semantics unit includes behaviour specification rules for transforming the source data model into an internal generic data model and is configured to consume the behaviour specification and further define the first data model in terms of the user environment;

wherein the design modelling application is associated with at least one of: (i) a project tree viewer for outputting the internal generic data model in a project tree; (ii) a diagram tree viewer for outputting the internal generic data model in a diagram tree; (iii) an object explorer for outputting an object in the user environment, the object corresponding to a document element; (iv) a properties viewer for outputting one or more object properties; (v) a base model designer for developing the first data model; and (vi) an editor for modifying one or more files associated with the design modelling application.

18. A computer program product comprising a non-transitory computer readable medium having computer readable code embodied therein for use in the execution in a computer of a design modelling system for operating on a plurality of disparate data models in a model editing application, the design modelling system comprising:

the model editing application, wherein the model editing application includes a modelling development environment module that includes: (i) a syntax and integrity component and (ii) a semantics unit;

a plurality of schemas, each schema defining a structure for a respective one of the plurality of disparate data models, the structure including a plurality of different document elements;

the plurality of disparate data models, each disparate data model comprising a structured document conforming to a different one of the plurality of schemas; and a plurality of behaviour specifications, each behaviour specification being associated with a different one of the plurality of disparate data models, each behaviour specification for configuring behaviour of the model editing application in regards to the plurality of different document elements of the respective data model, wherein each behaviour specification defines: (i) an name for a first document element of the respective data model, the name to be output for display in the model editing application, (ii) whether the first document element is visible in the model editing application, and (iii) whether the first document element is modifiable by a user of the model editing application;

wherein the modelling development environment module configures behaviour of the model editing application based on: (i) a first data model of the plurality of disparate data models, (ii) a schema associated with the first data model, the schema being selected from the plurality of schemas, and (iii) a behaviour specification associated with the first data model, the behaviour specification being selected from the plurality of behaviour specifications, whereby the model editing application is configured such as to provide a user environment for editing the first data model in accordance with the behaviour specification, wherein configuring behaviour of the model editing application comprises constructing an internal generic data model based on the first data model, the schema, and the behaviour specification;

wherein the behaviour specification further defines: (i) a model structure in terms of the user environment and (ii) meaning of document elements; wherein the syntax and integrity component defines at least one class of the first data model, wherein the semantics unit includes behaviour specification rules for transforming the source data model into an internal generic data model and is configured to consume the behaviour specification and further define the first data model in terms of the user environment;

wherein the design modelling system further comprises at least one of: (i) a project tree viewer for outputting the internal generic data model in a project tree; (ii) a diagram tree viewer for outputting the internal generic data model in a diagram tree; (iii) an object explorer for outputting an object in the user environment, the object corresponding to a document element; (iv) a properties viewer for outputting one or more object properties; (v) a base model designer for developing the first data model; and (vi) an editor for modifying one or more files in the design modelling system.

* * * * *